G. E. HOGLUND.
PROCESS FOR PRODUCING COLORED FILMS FOR ANIMATED PICTURES.
APPLICATION FILED AUG. 10, 1909.
971,890.
Patented Oct. 4, 1910.
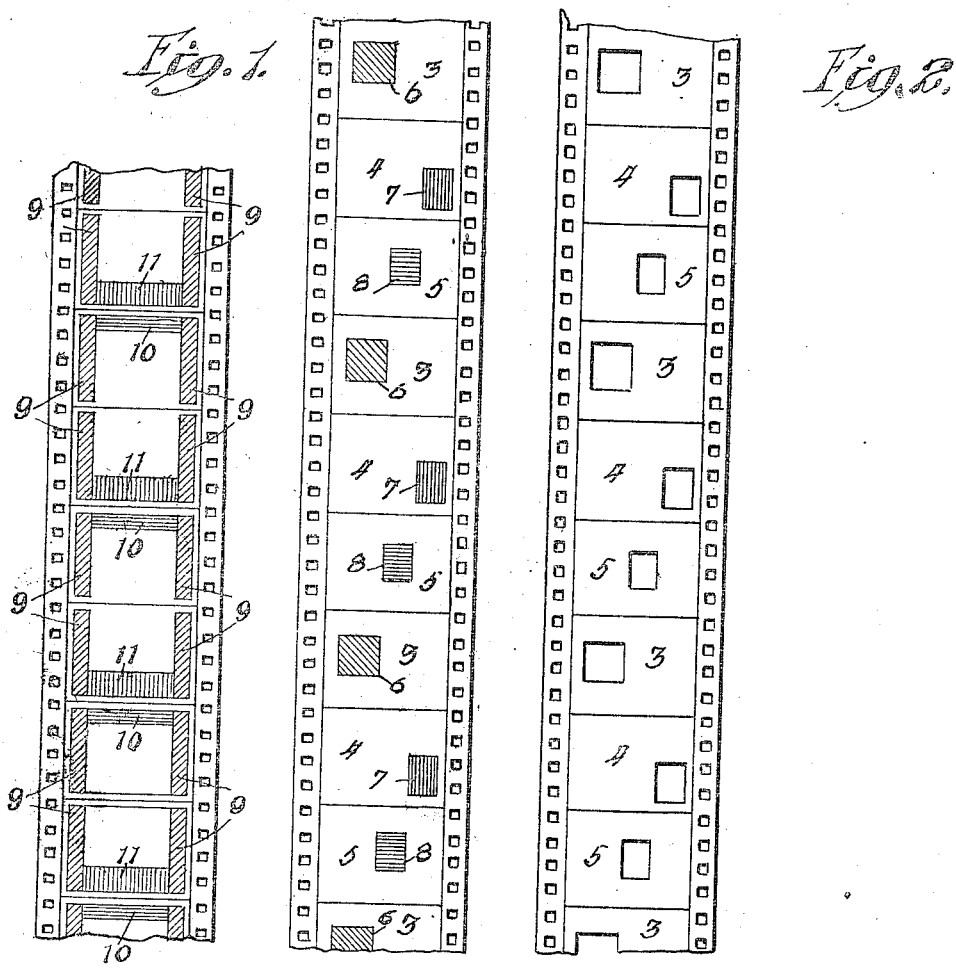

UNITED STATES PATENT OFFICE.

GUSTAV E. HOGLUND, OF CHICAGO, ILLINOIS, ASSIGNOR TO SELIG POLYSCOPE COMPANY, OF CHICAGO, ILLINOIS, A CORPORATION OF ILLINOIS.

PROCESS FOR PRODUCING COLORED FILMS FOR ANIMATED PICTURES.

971,890. Specification of Letters Patent. Patented Oct. 4, 1910.

Application filed August 10, 1909. Serial No. 512,240.

*To all whom it may concern:*

Be it known that I, GUSTAV E. HOGLUND, a citizen of the United States, residing at Chicago, in the county of Cook and State of Illinois, have invented certain new and useful Improvements in Processes for Producing Colored Films for Animated Pictures, of which the following is a specification.

In producing colored films of this character, the method commonly employed is to either tint the picture by hand or through a long process of color photography. In view of the fact that color photography is in an undeveloped state, it is attended, in a great many instances, with failure, and the tinting process is objectionable because of the length of time necessarily employed in the coloring of so many pictures.

In the methods above referred to, every part of each separate picture is colored; and the object of the present invention is to produce the same results to the eye when the pictures are thrown on the screen as results from completely colored pictures, without coloring every part of each picture, but only a certain portion of each picture, dividing the films into a number of consecutive series, a portion of each picture of the series being colored and the same color scheme running through corresponding pictures in the different series.

In the drawings, Figure 1 is a face view of a film completely colored; Fig. 2 a view of the stencil employed in coloring the film and Fig. 3, a face view of a tinted film with the coloring applied thereto.

As shown in the drawings, the film 3 is divided into series of three pictures, as indicated by the numerals 3, 4 and 5, each of the pictures of the series having a portion of its surface colored.

As indicated in picture 3, a portion 6 is colored green; in picture 4 a portion 7 is colored blue; and in picture 5 a portion 8 is colored red. This same order of coloring is followed throughout the entire set of pictures. We will assume, for the purposes of illustration, that in this particular picture there is a red house, a blue sky, and green trees. On every third picture the green trees will be colored, and on the other two the trees will appear in the ordinary black of the film, the same statement applying to the blue sky and red house. When the pictures are projected rapidly upon the screen, the colors will blend, producing, by the same optical delusion which is manifest in moving pictures, the effect to the eye of a completely colored picture. I have also discovered that, by tinting the film, certain colors will become opaque thereon, causing them to stand out prominently, so that when the background of the film is tinted it becomes necessary to color only two of the three pictures in the series, the third picture receiving its coloring through the tint in the film.

Referring to Fig. 2, there is shown a stencil for use in preparing the colored film. This is produced by taking a positive film from the negative in the manner ordinarily employed. From this positive film certain portions of each picture are cut out. The stencil is then superimposed upon the film to be colored and coloring matter applied to the portions of the film which are exposed. In case a tinted film is used, portions are cut out from only two of the three pictures in the series, some portion of every third picture being rendered dark by the tint and standing out from the rest of the film. The above process is described for the purpose of showing one way in which this result can be accomplished. There are, however, numerous old and well known methods by which this coloring can be done.

In Fig. 3 of the drawings is shown a film in which a green tint is used as a background for the entire picture. Therefore, the portions of the landscape which are green will be of pronounced coloring upon the film; that is, they will stand out more prominently than the rest of the picture in which other colors are employed. The film of Fig. 3 shows a portion 9, which is produced from an object having a green coloring, a portion 10 from an object having a blue coloring, and a portion 11 from an object having a red coloring. The green color scheme will, of course, be manifest throughout the picture, but by coloring a certain portion blue in every other picture, and a certain portion red in every other picture, making a consecutive series of pictures, the first of which would be in blue and green, the second in red and green, and so on down the film one is enabled to produce a completed picture having the red, blue and green colors thereon.

I claim:

1. The process of coloring animated picture films, which consists of dividing a film into series containing a selected number of pictures, cutting out a selected image from each picture, each corresponding picture of the series of pictures having a like image cut out therefrom, superimposing the stencil thus formed over a duplicate film of that from which the stencil was made, said latter film having a tinted background, and applying selected coloring matter to each exposed part of the film lying below the stencil, thereby producing a film having a general color for a background, each picture having an image thereon of a color distinct from the background, the colors blending when the pictures are projected to produce a completely colored picture, substantially as described.

2. The process of coloring animated picture films, which consists in dividing a film into series containing a selected number of pictures, cutting out a like image from each corresponding picture of the series of pictures, superimposing the stencil thus formed over a duplicate film of that from which the stencil was made, and applying selected coloring matter to each exposed part of the film lying beneath the stencil, thus producing a series of pictures, each containing a selected number of pictures, each corresponding picture of the series of pictures having the corresponding image therein of the same color, the colored images of the different pictures blending when the pictures are projected to produce a completely colored picture, substantially as described.

GUSTAV E. HOGLUND.

Witnesses:
 WM. P. BOND,
 FRANCES M. FROST.